Nov. 26, 1963    H. R. WIANT    3,112,389
UNIT BRAZING FIXTURE
Filed July 3, 1959    3 Sheets-Sheet 1

HERMAN R. WIANT
INVENTOR.

BY
ATTORNEYS

Nov. 26, 1963　　　H. R. WIANT　　　3,112,389
UNIT BRAZING FIXTURE
Filed July 3, 1959　　　　　　　　　　　3 Sheets-Sheet 2
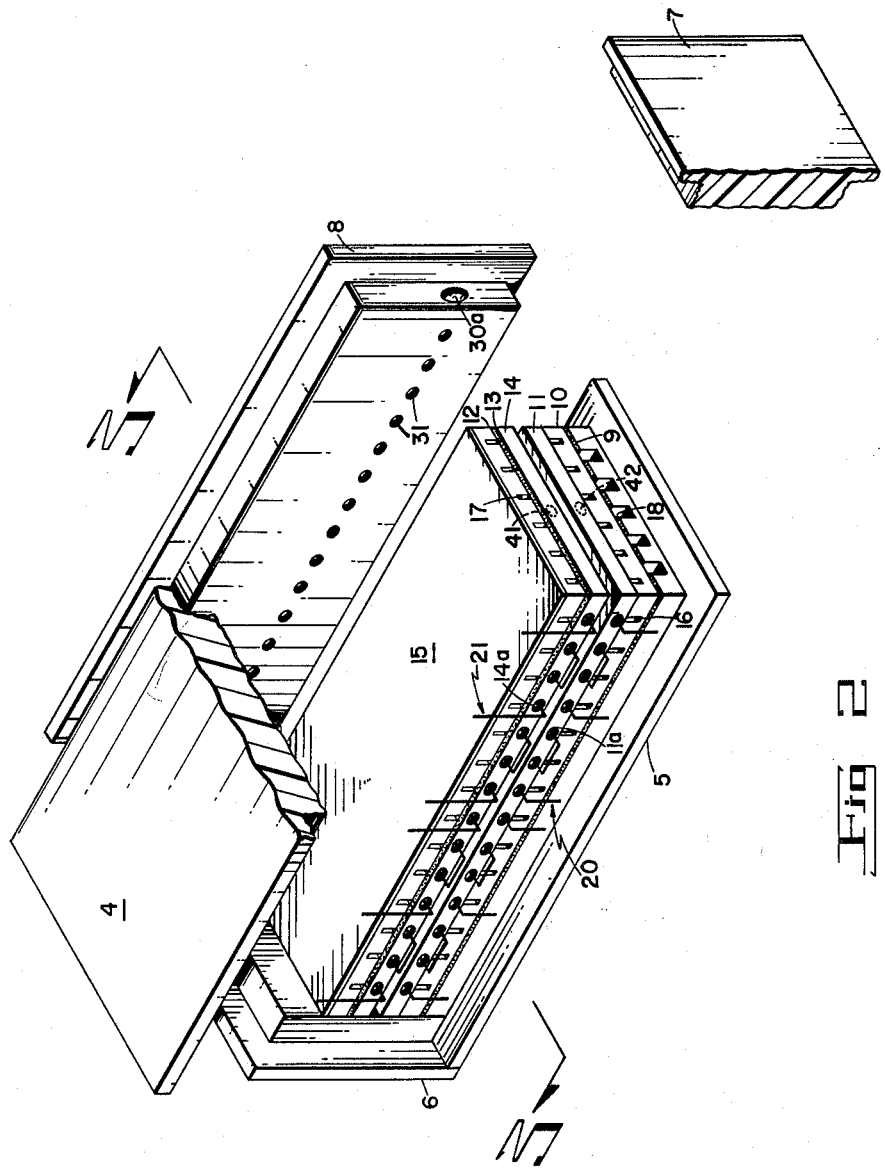
HERMAN R. WIANT
INVENTOR.
BY
ATTORNEYS

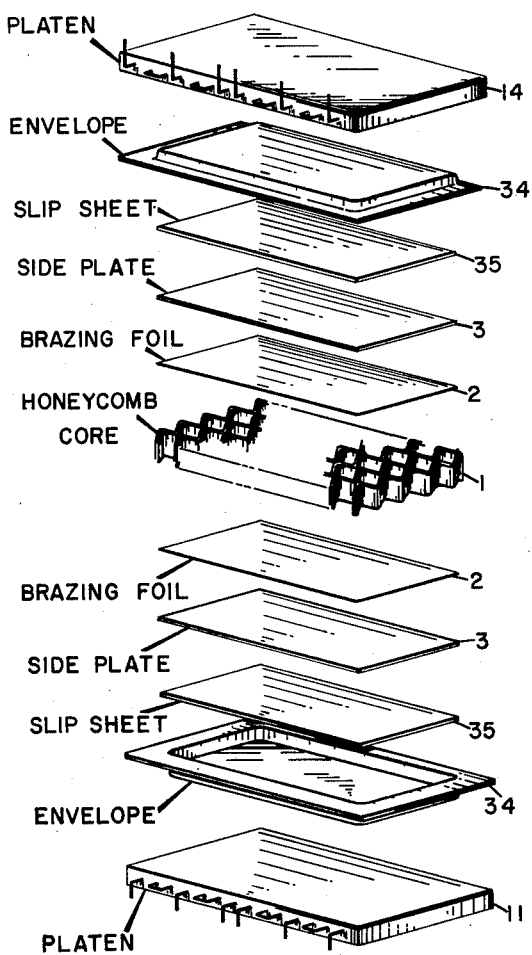

United States Patent Office 3,112,389
Patented Nov. 26, 1963

3,112,389
UNIT BRAZING FIXTURE
Herman R. Wiant, Beverly, Mass., assignor to Avco Corporation, Cincinnati, Ohio, a corporation of Delaware
Filed July 3, 1959, Ser. No. 824,834
8 Claims. (Cl. 219—85)

The present invention relates to a brazing fixture and method for use in assembling brazed structures and, more particularly, honeycomb reinforced panels. Panels of this type are being widely used today in advanced type aircraft since their strength-to-weight ratio is higher than conventional structures used heretofore. Such panels generally comprise a core of honeycomb configuration brazed to side plates having smooth exterior surfaces.

Most steel honeycomb panels are brazed in furnaces, the panels being supported during brazing by graphite fixtures. Not only are the fixtures relied upon to impart the final shape to the panels but also to hold them in assembled relationship during the brazing operation. Although brazing in this manner has met with limited success, a number of serious drawbacks are present. For one thing, a relatively large and expensive brazing furnace is required. Further, the graphite fixtures are usually quite large, and since they must be machined to shape, are relatively expensive. Since the brazing operation is carried out at high temperature, it is desirable to provide a protective atmosphere around the panel components. Use of hydrogen, which is desirable for reducing surface oxides, is not possible, however, when graphite fixtures are used, since at high temperatures the hydrogen reacts with the carbon of the fixtures.

A principal drawback of the conventional graphite-furnace technique of brazing panels is the lack of temperature uniformity. Since the rate of heat transfer through a fixture varies with its thickness, temperature uniformity is difficult, if not impossible, to attain. As a result, uneven brazing and warping of the finished panel may occur.

As the need for finished panels of increased strength has grown, manufacturers have resorted to newer and more complex type materials. One such material is a precipitation-hardenable alloy which, to develop optimum characteristics, must be quenched rapidly immediately after brazing. This is extremely difficult to accomplish with graphite fixtures because of their thermal mass. This has created a pressing need for an improved type fixture and method of brazing panels of such advanced type materials. This need has been admirably met by the present invention.

Briefly stated, the present invention relates to a unit fixture by means of which both brazing and heat-treatment of panels can be readily accomplished. The fixture comprises molded ceramic platens between which the components of the honeycomb panel are held in assembled relationship. Associated with the platens are heating means for raising the panel components to brazing temperature. Also associated with the platens are cooling means by means of which both the platens and the brazed panels can be quenched to develop the optimum properties of the finished panels. Since the platens may be readily cast in sections and in the configuration of the finished panels, an obvious economy can be effected.

In the preferred embodiment of the invention, the platens are cast with internal passages in which may be disposed electrical resistance-type heating elements. The same passages may also be used for cooling the platens and panel after brazing by introduction of air under pressure, steam, water vapor, or other suitable fluids. Although the invention will be described with specific reference to platens cast of siliceous material and heating elements comprising electrical resistance wires, it should be understood that platens made of other materials, employing heating and cooling means different from those described, may be used.

Since the platens may be readily cast to shape and may be made with a uniform wall thickness, temperature uniformity at all points of the panel may be attained during brazing. The platens, having low thermal mass, may be rapidly quenched.

Protection of panel components by a gas atmosphere may be simplified when brazing is done by means of the present invention. Since the platens are made of ceramic which does not react with hydrogen, even at high temperatures, hydrogen gas may be used as the protective atmosphere. Because of the reducing properties of this gas, cleanliness requirements of the components are less exacting than in graphite fixture-furnace brazing techniques. Obviously, inert gases, such as argon and helium, may be substituted for hydrogen if desired.

Because of their simplicity, platens are easily made at low cost, so much so that they may be regarded as expendable, rather than low-term, tooling. As a result, the platens may be employed when only a few pieces are to be brazed. The durability of the platens is such, however, that they may also be used for long-time, large volume production.

In view of the foregoing, it is a broad object of the present invention to provide an improved fixture and a method of brazing composite structures. More particularly, it is an object to provide a unit brazing fixture and a method for use in brazing and heat treating honeycomb panels.

A further object of the invention is to provide a brazing fixture and method that eliminate the need for a brazing furnace.

A further object of the invention is to provide a fixture in which uniform brazing and rapid quenching of a structure may be accomplished without removal of the panel from the fixture.

Another object of the invention is the provision of a brazing fixture incorporating both heating and cooling means for carrying out brazing and heat treatment of structures.

Still another object of the invention is to provide a brazing fixture and method that may be economically employed to braze structures in either limited or mass production quantities.

The novel features that I consider characteristic of my invention are set forth in the appended claims; the invention itself, however, both as to its organization and method of operation, together with additional objects and advantages thereof, will best be understood from the following description of specific embodiments when read in conjunction with the accompanying drawings, in which:

FIGURE 2 is a schematic exploded view of a fixture embodying the novel features of this invention;

FIGURE 6 is an exploded view showing the components of the panel and platens which position the panel during brazing.

Figure 1:
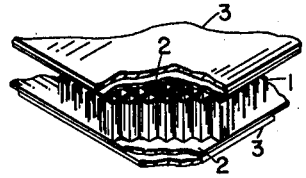
FIGURE 1 is a fragmentary perspective view of honeycomb panel components.

In FIGURE 1 there are shown the components of a honeycomb panel as assembled in preparation for brazing. Adjacent the honeycomb core 1 are positioned layers of brazing foil 2 which melt at high temperature to join side plates 3 to the honeycomb core. The resulting structure is both rigid and light in weight.

Figure 3:
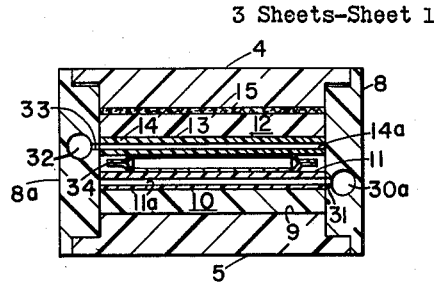
FIGURE 3 is a cross sectional view through the fixture taken on plane 3—3 of FIGURE 2.

In accordance with the present invention, a honeycomb panel of this type may be readily brazed with the aid of the fixture shown in FIGURES 2 and 3. In general terms, the fixture comprises top and bottom insulating walls 4 and 5, end insulating walls 6 and 7, and two side walls 8 and 8a of insulating material. In the interest of clarity only one of the side walls is shown in FIGURE 2.

The bottom insulating wall is cemented at 9 to a block of insulation 10 and to this block is cemented a ceramic platen 11. An upper block of insulation 12 is cemented at 13 to upper platen 14. Between block 12 and top wall 4 is provided a fibrous mat of insulation 15 (see FIGURE 3).

When fully assembled, the insulating walls of the fixture define a box within which platens 11 and 14 are juxtaposed in position to engage the components of the honeycomb panel to be brazed. As will be explained more fully hereinafter, intervening layers of material may be interposed between the platens and the panel components to prevent wrinkling and oxidation of the components during brazing.

Although for purposes of illustration, flat platens are shown in the accompanying figures, it should be understood that the platens can be formed in curved configurations for brazing of curved panels. In fact, one of the important advantages of the process is that it lends itself economically to the brazing of complex panels having compound curvatures.

The platens themselves may be cast of ceramic materials. This is particularly desirable since the resulting platens have almost zero coefficient of thermal expansion. Hence, platens of this type are extremely resistant to thermal shock and may be rapidly heated and cooled without damage.

Platens may be cast in a mold to the shape of the panel to be brazed. A castable ceramic which has been found satisfactory is made from 96% silicon dioxide filler material mixed with a liquid binder to give integrity to the casting. A successful material is obtainable in powdered form and is sold commercially as Glascast No. 56 and Glascast Grain by Corning Glass Company, Corning, New York. A typical filler composition is as follows:

3000 gms. −325 mesh Glascast No. 56.
1500 gms. −25 +35 mesh Glascast Grain
1500 gms. −50 +80 mesh Glascast Grain The binder may comprise ethyl silicate and its reaction products. It may be mixed in the following proportions:

1000 ml. ethyl silicate (40%)
20 ml. HCl solution prepared by adding 17 ml. HCl (concentrated) to 1 liter of $H_2O$
600 ml. ethyl alcohol
190 ml. $H_2O$ The binder is agitated until uniform. It is then added to the filter material in a proportion of 1500 mls. binder to 6000 grams of filler material. To promote rapid setting of the mixture, an accelerator, such as calcium oxide, may be added to the dry filler material in the proportion of 2.5 grams of calcium oxide to 6000 grams of filler. Complete setting will occur in approximately 20 to 60 minutes, depending upon ambient temperatures.

After a cast platen has set, an initial curing of 24 hours at room temperature is recommended before the platen is removed from its mold. This may be followed by a low temperature cure at about 250° F. for a period of several hours. Warpage of the platen may be minimized if it is restrained during curing at temperatures above room temperature. Final curing is effected by firing at 800–1800° F. for 30 minutes.

It should be understood that the before-mentioned composition of both binder and filler does not constitute a limitation of the present invention since other high temperature ceramics may be used.

The insulating walls 4–8 and 8a and insulating blocks 10 and 12 may be made from any high grade insulation. It has been found satisfactory to make these walls from a commercial insulation known as "Foamsil," a furnace insulation composed of 99% silicon dioxide foamed during manufacture to an approximate density of 15.5 lb./ft.$^3$. Foamsil is a product of the Pittsburgh Corning Glass Co., Pittsburgh, Pa.

It is desirable to make the insulating blocks of sufficient thickness to lend support to the ceramic platens. Foamsil has the desirable properties of rigidity, low thermal conductivity, high strength and thermal shock resistance. The cast platens may be attached to the Foamsil insulating blocks by any suitable high temperature cement, or more particularly, by a cement consisting of the same materials from which the platens are cast.

As indicated in FIGURES 2 and 3, a fibrous mat 15 is desirably positioned between insulating wall 4 and insulating block 12. This insulation may be aluminum silicate fiber and may be obtained from the Carborundum Co., Niagara Falls, New York. The mat distributes the load from the top insulating wall to the insulating block and assures uniformity of pressure on the panel components during brazing. If necessary for the brazing of a particular part, weights may be piled on the top insulating wall to further load the components. Obviously, pressure may also be applied by means of hydraulic or pneumatic devices (not shown).

In order to balance the heat loss through the top and bottom of the assembled fixture, a thermal barrier may be formed in the bottom insulating wall 5. The thermal barrier may comprise a plurality of longitudinal slots 18. This thermal barrier may be eliminated if the assembled fixture is supported in such a manner that air may circulate freely around both the top and bottom of the fixture during processing of the panel.

A plurality of saw cuts 16 and 17 may be provided in insulating blocks 10 and 12 to accommodate differential thermal expansion that may be experienced during heating and cooling of the fixture.

Figure 4:
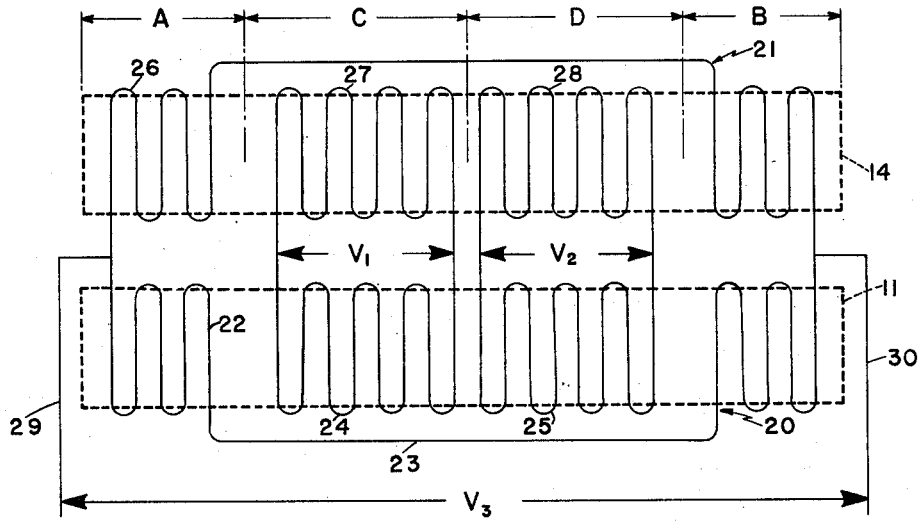
FIGURE 4 is a wiring diagram of the electrical resistance heating elements employed in the fixture shown in FIGURES 2 and 3.

Heat for the brazing process is preferably supplied by means of electrical resistance wires. As indicated by FIGURES 2 and 4, the wires may be disposed within the platens. For this purpose, a plurality of parallel holes 11a and 14a are cast within the platens. This may be easily accomplished by embedding cardboard tubes in the ceramic material while it is still plastic. During the firing of the platens, the cardboard tubes are burned away leaving clean passages into which the electrical resistance wires may be inserted. For platens of 1″ thickness it has been found desirable to provide 0.5″ diameter holes spaced on 0.75″ centers.

Although for simple flat platens, it is satisfactory to cast ceramic material in a horizontal position with the cardboard tubes disposed in a horizontal plane, casting of the material in a vertical position is sometimes more desirable for platens of complex shape. This has several advantages, i.e., the cardboard tubes have little tendency to "float" in the ceramic mixture thus affording a more uniform platen, and handling of the platens is simplified, with less tendency to fracture prior to firing. When curved platens are to be made, it is necessary to preform the cardboard tubes to follow the contour of the platens as cast. This may easily be accomplished by slipping the cardboard tubes over a metal mandrel which shapes them to the desired curvature. While on the mandrel the tubes may be impregnated with an acrylic resin which, upon hardening, assures that the tubes will retain the desired shape. After the resin has hardened, the tube may be slipped from the mandrel and cast in the platen. Mandrels made of materials other than metal may also be used for imparting unusual curvatures to the cardboard tubes. Thus, mandrels made of woods, metal or hard wax may be employed. In such case, the impregnating resin employed should be capable of withstanding 200° F. until the mandrel is melted from within the tube. For this purpose, an epoxy resin is recommended.

In casting of ceramic fixtures no size limitation need theoretically be observed. As a practical matter, it has been found, however, that the size should be limited to that point where the weight of the "green" cast platen exceeds its "green strength."

It is entirely feasible to cast platens of 4' x 10' x 2" and to cure and fire such large size castings by inserting heating elements in the tubes of the green casting. This eliminates need for a firing furnace. Should such an approach be used, the heating elements may be left in place in the casting after it is fully cured, saving the step of inserting them at a later time.

The heating elements associated with platen 11 are generally designated 20 in FIGURE 2, those associated with platen 14 being generally designated 21. Although the electrical resistance wire may be simply a continuous length of wire snaked through both upper and lower platens, it has been found desirable to construct the heating element in separate sections so that temperature of the platens may be controlled by zones. This is illustrated by FIGURE 4 which shows the arrangement of wires in the platens schematically. The platens have been divided longitudinally in zones A–D. Directing attention first to platen 11, it will be noted that resistance wire 22 extends through zones A and B and is interconnected by conductor 23; a separate wire 24 is disposed in zone C and still another wire 25 is disposed in zone D.

The wiring of platen 14 is arranged in a similar manner, wire 26 extending through zones A and B while wires 27 and 28 are separately disposed in zones C and D.

Wires 24 and 27 may be interconnected and energized from a common potential source $V_1$. In a similar manner, wires 25 and 28 may be interconnected and energized from source $V_2$. Wires 22 and 26 are also energized from a common source $V_3$ through conductors 29 and 30.

It will be noted that the heating elements in the associated zones of the platens are energized in parallel from their common sources. By conventional means not disclosed, the associated heating wires may be separately controlled through control of the voltage of sources $V_1$–$V_3$. Generally speaking, more power is dissipated in the wires of zones A and B than in C and D to offset the higher rate of heat loss at the ends of the platens. By virtue of the separate control that may be exercised with respect to zones C and D, uniform brazing of unsymmetrical panels, those having inserts for instance, may be accomplished.

The type of resistance wire used is optional. It has been found desirable, however, to use a low current-high voltage element. This has the advantage of low metal mass, ease of power distribution, and flexibility, which helps during installation. With high voltage heating elements, high current transformers are not required. The relatively large resistance of the heaters eliminates the need for close tolerance of the resistance, and uniform heating is easily attained.

A typical heating element that has been used successfully with platens of 1" thickness has a wattage density of 18.5 watts per square inch, operating at 225 volts. When installed in a panel having hole sizes and spacing as indicated earlier, actual heat dissipation approximates 37 watts per square inch of panel. Elements may be made from 80% nickel–20% chromium alloy, a material designed for service in air, inert or reducing atmospheres at temperatures up to 2000° F.

The holes through the platens may also be used for cooling the platens and panel after brazing. The desirability of such cooling will be considered in greater detail later in the specification. It will be sufficient to note at this time that manifolds, such as indicated at 30a, in wall 8 (see FIGURE 2), may be connected to a plurality of passages 31 which correspond in location to one set of holes through one of the platens, such as platen 11. Through the manifold and connecting passages may be introduced air under pressure. The air, after flowing through the holes of the platen, leaks through the crevices of the fixture and rapidly cools the entire assembly as required for heat treatment of the panel after brazing.

A comparable manifold 32 and associated passages 33 may be provided in the opposite side wall 8a as indicated in FIGURE 3. Assuming that manifold 30a is aligned with the holes of platen 11, manifold 32 would be aligned with the holes of platen 14. By simultaneously introducing coolant to both manifolds, both platens are cooled at the same time and at the same rate.

As indicated earlier in the specification, cooling may also be effected by air, water vapor or steam. Obviously, any other suitable coolant, such as carbon dioxide, may be used.

In using the novel fixtures of the present invention for brazing honeycomb panels, the fixture is assembled as follows: the bottom wall with its associated insulation and platen is first prepared for use. As indicated in FIGURE 6, an envelope 34 containing the components to be brazed, as will be described, is centered on the lower platen 11 (see FIGURE 3). The insulating block 12 with its platen 14 is then positioned above the envelope and fiber mat 15 is placed above the insulating block. The side and end insulating walls of the fixture may then be placed in position. Thereafter, the top insulating wall is dropped in place above the fiber mat.

After suitable connections have been made to the power and coolant sources, the assembled fixture is ready for use.

The envelope 34 may be made from thin sheets of stainless steel of .008–.020 inch thickness. As illustrated by FIGURE 6, the walls of the envelope are spaced from side plates 3 of the panel components by slip sheets 35. The slip sheets may also be made of stainless steel of about .010 inch thickness. They permit relative movement between the side walls of the envelope and the side plates of the panel, assuring that the panel components will retain the proper relative position as heating and cooling of the assembly occurs. The slip sheets have the further benefit of simplifying handling of the panel components and protecting them from damage.

By means of suitable connections (not shown) the protective atmosphere may be introduced to the envelope. It is good practice to introduce the protective gas to the envelope and exhaust it two or three times to purge the envelope of any entrapped air. Thereafter, the protective gas may be maintained in the envelope at a pressure slightly below atmospheric. The partial vacuum present in the envelope with the aid of atmospheric pressure forces the panel components into metal-to-metal contact with the brazing foil 2 and assures complete brazing of abutting surfaces.

Figure 5:
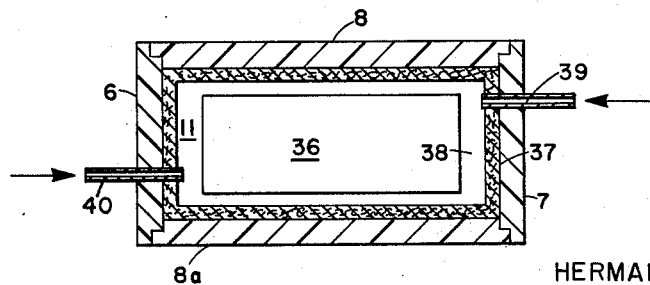
FIGURE 5 shows to a reduced scale a modified arrangement for introducing a protective atmosphere adjacent the panel components during brazing.

An advantage of the present invention is that, depending upon the materials being brazed, the envelope may be eliminated. This is illustrated by FIGURE 5 in which panel assembly 36 is shown resting directly on platen 11. In this case, no envelope is present and instead, fibrous aluminum silicate insulation is packed in the space between the platens, as indicated at 37. A gas channel is formed by the platens at 38 into which protective gas is introduced by means of conduits 39 and 40. Although the gas is confined adjacent the panel by the packing, it eventually seeps through the packing, permitting additional gas to flow into the channel 38.

Elimination of encapsulation represents a very significant economy. As will be understood by those skilled in the art, the envelope must be welded together for each panel to be brazed at a significant cost in materials and labor. Panels brazed without encapsulation, as illustrated by FIGURE 5, may in some instances be slightly discolored through oxidation but will nevertheles be structurally sound. Since oxidation of surfaces to be brazed may interfere with wettability by the brazing alloy, it is sometimes desirable to first copper plate such surfaces. If this is done over selected areas, indiscriminate flow of brazing alloy can be avoided.

The method of using the novel fixture is best described with respect to a typical advanced type material that is now in use in honeycomb panels. Such a material is PH 15–7 Mo produced by the Armco Steel Company, Middletown, Ohio.

Brazing of such material by a sterling silver brazing alloy containing .2% lithium as a fluxing agent can readily be accomplished by heating the components to be joined to 1650–1675° F. Although the rate of heating the components is immaterial, it is desirable to maintain the components at temperature for a relatively short time, such as one to two minutes. This promotes better fillet formation at the point where the brazing alloy wets the components being joined.

Immediately after brazing, the components should be cooled or quenched to a temperature below 1000° F. in the least possible time. The more rapidly quenching is accomplished, the higher is the strength and rigidity of the resulting panel. Quenching within one minute after brazing is considered optimum, although if accomplished in no more than 20 minutes, results will be at least acceptable. After quenching, the panel should be held at −100° F. or lower in temperature for a period of 8 hours to complete the transformation of austenite in the steel to martensite. The panel should then be aged at 950° F. for at least one hour to temper the martensite and complete precipitation hardening of the steel. The foregoing is what is known as a "RH–950 heat treatment" by those familiar with materials of this type.

In view of the foregoing processing for such materials, it will be immediately apparent that quenching immediately after brazing is essential. This is extremely difficult to accomplish if the fixtures employed are massive and hold their heat, resisting rapid quenching. By means of the presnet invention, however, rapid quenching is easily accomplished. For example, compressed air may be passed through the passages in the platens to cool the components to room temperature. Thereafter, for example, liquid nitrogen may be utilized to provide a heat exchange fluid to further cool the components to sub-zero temperatures. As has been mentioned, this is a function of the low thermal mass of the platens and the fact that heat is directly introduced into the platens and removed from the platens during the brazing and heat-treating portions of the process. An advantage of the ceramic platens is that they can tolerate the radical temperature changes without damage. Being made mostly of $SiO_2$, which has a low co-efficient of expansion, large temperature changes cause practically no change of physical dimension. Hence the platens are highly resistant to thermal shock.

Uniform heating and cooling may be readily accomplished by means of the novel fixtures disclosed. Despite such uniformity, there obviously is some tendency for the edges of the panel to lose heat more rapidly than the central portions. This may be overcome by making the platens larger than the panel being brazed. A rule of thumb is to make the platens overhang the edge of the panel by an amount equal to approximately 8 times the panel thickness. If the space between the panels is packed with insulating materials, the heat radiated by the packing will also promote uniform heating of the panel. It is also feasible to construct the heating elements in such fashion that higher energy input results at the edges of the platens than at the center. This may be done by making the heating elements in coil form and choosing the number of coils per inch to produce the rate of heat dissipation desired. If extreme uniformity of edge temperatures is important, a perimeter heating element may be installed around the edges of the panel in the space between the platens.

When extreme uniformity of cooling is necessary, the manifolds for distributing the coolant may be molded directly in the platens themselves. Such a manifold is indicated with respect to each of the platens by dotted lines at 41 and 42 in FIGURE 2. These manifolds intersect the centers of all of the transverse holes in the associated platen and make it possible to distribute the coolant from the central plane of the platen outwardly toward both of its sides.

In summary, it will be recognized that the present invention makes available an improved fixture and method of uniformly brazing and rapidly quenching composite structures such as honeycomb panels. Variations and modifications of the invention will occur to those versed in the art, all of which may be achieved without departing from the spirit and scope of the invention.

I claim:

1. In combination in a fixture for brazing and heat treating the components of a honeycomb reinforced panel, a pair of cast and fired siliceous platens engaging the components and holding them in a predetermined relationship, cast and fired siliceous insulating blocks for reinforcing and supporting said platens, said blocks being cemented to their associated platens, a cast and fired siliceous insulating enclosure surrounding said platens and insulating blocks, and electrical resistance means imbedded in said platens for heating said platens and brazing the honeycomb components, a plurality of passages in said platens for conveying coolant through said platens, said insulating enclosure including passages corresponding in location to those of said platens whereby coolant may be introduced to the passages of said platens for quenching the panel.

2. Apparatus as defined in claim 1 and, in addition, a fibrous mat between said insulating enclosure and one of said platens.

3. Apparatus as defined in claim 2 and, in addition, a hermetically sealed envelope surrounding the honeycomb components.

4. Apparatus as defined in claim 2 and, in addition, means for introducing a protective atmosphere between said platens and adjacent the honeycomb panel.

5. In combination in a fixture for brazing and heat treating components of a honeycomb reinforced panel, a hermetically sealed envelope for maintaining a protective atmosphere adjacent the components, a pair of cast and fired ceramic platens fixedly engaging said envelope for holding the components in a predetermined relationship with one another, a plurality of passages in said platens, an electrical resistance element disposed in the passages for heating said platens and said envelope whereby brazing of the panel is accomplished, low density ceramic insulating means attached to the surface of said platens opposite said hermetically sealed envelope for reinforcing and supporting said platens, a low density ceramic insulating enclosure surrounding said platens and insulating means, said enclosure including means for introducing coolant from the central plane of said platens to the passages of said platens whereby the platens are uniformly cooled and heat treatment of the panel is accomplished.

6. A unitary apparatus for brazing and heat treating components of a honeycomb reinforced panel comprising a hermetically sealed envelope for maintaining a protective atmosphere adjacent the components, a pair of cast and fired ceramic platens fixedly engaging said envelope, means associated with said platens for introducing heat thereto and extracting heat therefrom whereby brazing and heat treatment of the panel is accomplished, low density ceramic insulating means attached to the surface of said platens opposite said hermetically sealed envelope for reinforcing and supporting said platens, and a low density ceramic insulating enclosure surrounding said platens and insulating means.

7. In combination in a fixture for brazing and heat treating the components of a honeycomb reinforced panel, a pair of cast and fired siliceous platens engaging the components and holding them in a predetermined relationship, said platens being comprised of silicon dioxide to provide a substantially zero coefficient of expansion and a low thermal mass, a manifold in said platens positioned in the central plane of said platens and a plurality of passages intersecting said manifold, at least one uninsulated electrical resistance element disposed in said passages for selectively heating selected portions of said platens whereby uniform brazing of said reinforced panel is accomplished, cast and fired siliceous rigid insulating blocks reinforcing and supporting said platens cemented to their associated platens, and a cast and fired siliceous insulating enclosure surrounding said platens and insulating blocks, said insulating enclosure including passages corresponding in location to those of said platens whereby coolant may be introduced to the manifolds and exhausted through said passages of said platens for uniformly quenching the reinforced panel.

8. The combination as defined in claim 7, and, in addition, a hermetically sealed envelope surrounding the honeycomb components.

References Cited in the file of this patent

UNITED STATES PATENTS

| | | |
|---|---|---|
| 1,476,116 | Thompson | Dec. 4, 1923 |
| 1,536,944 | Steenstrup | May 5, 1925 |
| 1,542,805 | Hathaway | June 16, 1925 |
| 2,035,707 | King | Mar. 31, 1936 |
| 2,332,368 | Burtenshaw | Oct. 19, 1943 |
| 2,627,010 | Matteson et al. | Jan. 27, 1953 |
| 2,693,636 | Simpelaar | Nov. 9, 1954 |
| 2,767,301 | Reichelt et al. | Oct. 16, 1956 |
| 2,799,693 | Dodgson | July 16, 1957 |
| 2,973,278 | Kadisch et al. | Feb. 28, 1961 |
| 2,984,732 | Herbert | May 16, 1961 |
| 3,011,926 | Rowe | Dec. 5, 1961 |

FOREIGN PATENTS

| | | |
|---|---|---|
| 4,017 | Great Britain | Feb. 16, 1914 |